United States Patent [19]

Agui et al.

[11] 4,186,167

[45] Jan. 29, 1980

[54] GRANULAR FLOCCULANTS AND THEIR MANUFACTURE

[75] Inventors: Wataru Agui, Tokyo; Nobuyuki Higosaki, Kiyose; Koichiro Yamanari, Tokyo; Toshio Furukawa, Tokyo; Hiroshi Kuyama, Urawa, all of Japan

[73] Assignee: Rohm and Haas Company, Philadelphia, Pa.

[21] Appl. No.: 953,136

[22] Filed: Oct. 20, 1978

Related U.S. Application Data

[62] Division of Ser. No. 872,963, Jan. 27, 1978.

[30] Foreign Application Priority Data

Jan. 31, 1977 [JP] Japan ................................. 52/8801

[51] Int. Cl.² .............................................. B01J 2/20

[52] U.S. Cl. ................................................... 264/141
[58] Field of Search ............................... 264/141, 117

[56] References Cited

U.S. PATENT DOCUMENTS

| 4,012,354 | 3/1977 | Paul ..................................... 260/29.6 |
| 4,055,617 | 10/1977 | Taga et al. ........................... 264/141 |

*Primary Examiner*—Robert F. White
*Assistant Examiner*—James R. Hall
*Attorney, Agent, or Firm*—John E. Taylor, III; Louis F. Kline, Jr.

[57] ABSTRACT

Polyvinylimidazoline flocculants are converted to an easily handled granular form by pelletizing with siliceous material and a lower alcohol, or mixture of lower alcohols with esters or ketones, and subsequently drying the pellets.

7 Claims, No Drawings

GRANULAR FLOCCULANTS AND THEIR MANUFACTURE

This is a division of application Ser. No. 872,963 filed Jan. 27, 1978.

This invention relates to granular polyvinylimidazoline type flocculants and their manufacture.

A cationic polyvinylimidazoline type high-molecular-weight flocculant is highly effective in improving the mechanical removal of water from a phase containing solids, i.e., the removal of sludge or slurry from sewage or industrial waste. Being in a finely divided state, the polyvinylimidazoline type high-molecular-weight flocculant disperses readily in air. It is also an irritant to the mucous membrane. This flocculant is highly hygroscopic, and tends to cake on absorption of moisture, with loss of fluidity. When this flocculant is packaged, stored or used, therefore, various precautions against moisture and dusting should be exercised. Since it is a polymer, it is poorly soluble, and a special apparatus such as an ejector jet is necessary to dissolve it. A need has existed for a soluble, easily handled form of this flocculant. The techniques developed to date for improving the solubility of the high-molecular-weight flocculant include a method which comprises suspending a powdered flocculant in a solvent immiscible with water, and dispersing the resultant suspension in water (U.S. Pat. No. 2,282,874); and a method which comprises blending a powdered flocculant with water or a water-containing hydrophilic organic solvent, drying the resultant mixture and pelletizing the dried mixture (Japanese Patent Disclosure (Unscreened) No. 83681/1974). A problem with the former method is that the solvent and surfactant used in the process increase the BOD and COD of a liquid under treatment. With the latter method, the flocculant immediately turns into a highly viscous, rubbery material upon addition of water or a water-containing, hydrophilic, organic solvent, and can no longer be kneaded.

The inventors have discovered a method for the manufacture of a stable high-molecular-weight flocculant which comprises mixing a powdery polyvinylimidazoline type high-molecular-weight flocculant with a binder substantially insoluble in water, kneading the resulting mixture with an organic solvent in which the flocculant is substantially insoluble, pelletizing the resulting mixture, and finally drying the pelletized mixture.

In the practice of this invention, one part of a polyvinylimidazoline type high-molecular-weight flocculant is mixed with 0.05 to 1.0 part, preferably 0.1 to 0.4 part, of a binder substantially insoluble in water, the binder being silica or a substance composed predominantly of silica, such as a member or a mixture of two or more members selected from the group consisting of colloidal, precipitated silica, talc, kaolin, active terra alba, clay, diatomaceous earth and bentonite. One part of the resulting mixture is thoroughly kneaded with 0.4 to 1.0 part of an organic solvent in which the flocculant is substantially insoluble. Suitable organic solvents include lower alcohols, as for example methanol, ethanol or isopropanol; ketones, as for example diethyl ketone, acetone or methyl ethyl ketone; esters, as for example ethyl formate, ethyl acetate or methyl acetate; and mixtures thereof. Preferred organic solvents are methanol or mixtures of methanol with about 5 to about 25% by weight of other lower alcohols, ketones, esters or polyhydric alcohols such as ethylene glycol. The order in which the binder and the organic solvent are added to the flocculant may be reversed. The resulting mixture is pelletized by a suitable pelletizer such as, for example, an extrusion pelletizer. The granular product is obtained by subsequently drying the pellets of mixture, preferably at temperatures in the range of from about 50 to about 60° C. for about 30 to 60 minutes, to expel the solvent. The binder made solely of silica or predominantly of silica increases the viscosity of the mixed system of flocculant and solvent, imparts thixotropy to the mixture and improves extrudability. When the perforations in the extruder die have a diameter of 1 milliliter or smaller, pelletizing can be facilitated by increasing the amount of the binder by several percent. If the amount of the solvent added is reduced to less than that specified, the adhesive effect of the powder becomes inadequate and the pelletization becomes difficult. If the amount is conversely too large, the individual particles resulting from the pelletization cohere in lumps upon drying.

The pelletized product obtained by the process of this invention is less hygroscopic than the unpelletized flocculant, and is strong enough to withstand normal handling. When added to water, the pellets do not stick to one another, and the flocculant itself disperses readily without agglomeration, and dissolves quickly.

Another characteristic of the present invention is that since the binder incorporated in the flocculant is substantially insoluble in water, it can easily be separated in conjunction with the flocculant through sedimentation, filtration, etc. If the binder were a water-soluble material such as carboxymethyl cellulose or sodium alginate it could not easily be separated, and would remain in the treated water, thereby increasing the numerical values of COD and BOD in the effluent.

The pellets of the present invention can easily be produced, and avoid the disadvantages resulting from the finely powdered flocculant stock; this contributes greatly to improved handling characteristics during use. When necessary, the flocculant pellets can be formulated to contain the flocculant component at a high concentration (for example, about 90%) without any inconvenience in transportation and storage.

The following examples will further illustrate the invention but are not intended to limit it. In the examples, as well as in the other parts of the specification and claims, parts and percentages are by weight unless otherwise stated. All chemicals used are of good commercial quality.

EXAMPLE 1

A 400 gram charge of powdered poly(2-vinylimidazoline)sulfate (the preparation of which is disclosed in U.S. Pat. No. 3,406,139) was thoroughly mixed with 42.5 grams of colloidal precipitated silica. The mixture was thoroughly kneaded with 360 grams of methanol containing 10% by weight of ethyl acetate. The blended mass was pelletized with a screw-type extruder having a die diameter of 15 millimeters. The pellets were dried at 50 to 60° C. of about 1 hour to make a granular product.

EXAMPLE 2

A 400 gram charge of flocculant (the same as that used in Example 1) was thoroughly mixed with 100 grams of talc. The resulting mixture was thoroughly blended with 300 grams of methanol, and was pelletized and dried according to the procedure of Example 1 to produce a granular product.

EXAMPLE 3

The procedure of Example 2 was followed, except 320 grams of methanol containing 10% by weight of acetone was used. A similar pelletized product was obtained.

EXAMPLE 4

A 375 gram charge of flocculant (the same as that used in Example 1) was thoroughly mixed with 125 grams of a mixture of 40% by weight of talc, 30% by weight of clay and 30% by weight of bentonite. The resulting mixture was thoroughly kneaded with 320 grams of methanol containing 20% by weight of ethyl acetate. The resulting mass was pelletized by an extrusion pelletizer having a die diameter of 2 millimeters. The product was dried according to the procedure of Example 1.

Water solubility of the flocculant products was determined using the following test for solubility:

A given test sample of the flocculant of this invention was placed in a 500-ml. beaker and diluted with water until the flocculant concentration was 4%. The contents of the beaker were agitated with a jar tester at a fixed rate (200 rpm). The change in viscosity of the contents under agitation was measured at time intervals using a rotary viscosimeter. The time elapsed until the viscosity ceased to change was reported as the time required for complete solution.

The capacity of the flocculant products to remove water from live sludge was tested using the following test:

Graduated cylinders having an inner volume of 200 ml. were each charged with 195 ml. of active sludge (MLSS 6600 ppm). The pelletized products of Examples 1–4 were respectively prepared as solutions having a flocculant concentration of 1%. Five milliliters of the flocculant solution were added to a cylinder containing the active sludge, so that the flocculant concentration would be 250 ppm; this concentration was determined in advance as giving the optimum removal of water by a test which involved adding 1% (wt.) solution of the flocculant of this invention. The mixture was agitated by inverting the cylinder ten times. The contents of the cylinder were inspected for flocculation of sludge and clarity of the supernatant. A 200-ml. portion of the sludge solution was transferred to a Buchner funnel having one filter paper of grade Tokyo No. 1 spread in position, and subjected to vacuum filtration for one minute (with the degree of vacuum at 21 millimeters Hg). A sample of the water-containing sludge retained on the filter paper was weighed, dried at 105°–110° C. until it reached a constant weight, allowed to cool in a desiccator and weighed accurately. The water content of the sludge was calculated based on the weights thus determined.

| Results: | Time for Solution | Water Content of Sludge (%) |
|---|---|---|
| Powdered product | More than 12 hours* | 87.0 |
| Pelletized product of Example 1 | 35 minutes | 87.5 |
| Pelletized product of Example 2 | 25 minutes | 87.0 |
| Pelletized product of Example 3 | 20 minutes | 86.9 |
| Pelletized product of Example 4 | 30 minutes | 87.0 |
| Omission of flocculant addition | — | 98.1 |

*Agglomeration ensued.

From the foregoing results, it is clear that the pelletized products by the method of the present invention have much better solubility than the powdered countertype. They substantially equal the powdered countertype in capacity for removal of water from sludge, size of flocks, clarity of supernatant and sedimentation of sludge.

We claim:

1. A process for making a granular flocculant which comprises: (a) mixing one part by weight of high-molecular-weight, polyvinylimidazoline flocculant with from about 0.05 to about 1.0 part of water-insoluble, siliceous binder, (b) kneading one part by weight of the resulting mixture with from about 0.4 to about 1.0 part by weight of an organic solvent in which the flocculant is substantially insoluble, (c) pelletizing the resulting mass, and (d) drying the pellets.

2. The process according to claim 1 wherein the amount of binder is from about 0.1 to about 0.4 part by weight.

3. The process according to claim 1 wherein the binder is selected from the group consisting of colloidal precipitated silica, talc, kaolin, active terra alba, clay, diatomaceous earth and bentonite.

4. The process according to claim 1 wherein the binder is colloidal precipitated silica.

5. The process according to claim 1 wherein the organic solvent is selected from the group consisting of lower alcohols, ketones, esters and mixtures thereof.

6. The process according to claim 1 wherein the organic solvent is methanol.

7. The process according to claim 1 wherein the organic solvent is methanol mixed with from about 5 to about 25% by weight of another organic solvent selected from the group consisting of alcohols having 2–3 carbons, ketones having 3–5 carbons and methyl and ethyl esters of formic and acetic acids.

* * * * *